United States Patent [19]

Otsuki

[11] Patent Number: 5,212,547
[45] Date of Patent: May 18, 1993

[54] IMAGE PROCESSING DEVICE AND METHOD FOR SENSING MOVING OBJECTS AND RANGEFINDER EMPLOYING THE SAME

[75] Inventor: Akira Otsuki, Matsudo, Japan

[73] Assignees: Fujikura Ltd.; FMT Ltd., Japan

[21] Appl. No.: 726,938

[22] Filed: Jul. 8, 1991

[30] Foreign Application Priority Data

Jul. 6, 1990 [JP] Japan ................................. 2-179047
Jul. 31, 1990 [JP] Japan ................................. 2-203018

[51] Int. Cl.$^5$ ........................ H04N 7/18; H04N 17/00
[52] U.S. Cl. .................................... 358/105; 358/139
[58] Field of Search ........................ 358/105, 125, 139

[56] References Cited

U.S. PATENT DOCUMENTS 4,729,021  3/1988  Kondo ................................. 358/105
5,023,712  6/1991  Kajiwara ............................. 358/105
5,023,713  6/1991  Nishigori ............................ 358/105

FOREIGN PATENT DOCUMENTS 0064192  11/1982  European Pat. Off.

Primary Examiner—John K. Peng
Attorney, Agent, or Firm—Scully, Scott, Murphy & Presser

[57] ABSTRACT

An image processing device and method for detecting moving objects against complex moving backgrounds, and a rangefinder based thereon are disclosed. The device and method are applicable to rapid and selective evaluation of complex visual fields, without the need for extensive numerical processing. The disclosed image processing method comprises the steps of obtaining sequential video frame data; storing video data in memory for a consecutive series of video frames obtained over a predetermined time interval in the past at a predetermined sampling rate; obtaining a standard image by averaging the video data stored in memory for the predetermined time interval so as to obtain video data representing a composite image for the predetermined time interval; and subtracting the video data for the standard image from video data for a current video frame.

5 Claims, 6 Drawing Sheets

IMAGE PROCESSING DEVICE AND METHOD FOR SENSING MOVING OBJECTS AND RANGEFINDER EMPLOYING THE SAME

BACKGROUND OF THE INVENTION

1. Field of the Invention

The present invention pertains to equipment and methods for image processing, and more particularly, to image processing equipment and methods suitable for detecting moving objects and for assessment of complex visual fields containing moving objects, including assessment of the distance between a moving object and a reference point in such a visual field.

2. Prior Art.

Video cameras offer a number of advantages as input devices for systems which rely on visual data. They are lightweight, relatively inexpensive and can be used in a variety of hostile environments which humans tolerate poorly, or not at all. Video cameras find wide application in security and surveillance systems, for process control, assembly control, customer and personnel monitoring, as well as for many other uses. For example, by means of a television system, one guard can monitor an extensive area, indoors and outdoors, from a climate controlled room. When real time monitoring is unnecessary, video signals from one or more cameras can simply be recorded on magnetic tape and viewed later as the need arises.

Despite the above described advantages of the video camera input devices, however, conventional video based surveillance and intrusion detection systems, motion sensors, monitoring systems and the like present one significant drawback in that someone must constantly view one or more video displays whenever real time monitoring is necessary. For this reason, it becomes expensive to operate these systems. In view of this shortcoming, various attempts have been made to develop systems whereby reliable computer analysis of video signals can be achieved, thereby permitting unattended automated or semiautomated operation.

Conventionally, methods and devices for detecting moving objects, and for assessment of visual fields containing moving objects have involved application of various types of mathematical operations to sequentially obtained images from a video camera. Examples include methods wherein sequentially obtained images of a given visual field are analyzed by using Fourier transform and digital or analog filtering techniques so as to determine whether there is an moving object in a frame.

Because of the complexity of most video signals, with any of the above described methods, in order to obtain reasonably precise and reliable results, high speed numerical processing equipment is an absolute necessity, especially when real time analysis is desirable. Consequently, conventional systems for analysis of visual fields containing moving objects have been very costly due to the expense incurred for the requisite high speed data processing facilities. Furthermore, the selectivity of conventional equipment of this type has been inadequate, with the result that spurious results are quite common with use thereof, particularly so when used under circumstances where the background is complicated and moving such as in outdoor applications. This problem relates to the fact that presently available methods and equipments are fundamentally based on a methodology for detecting a foreign object out of a visual field obtained at cirtain time. In other words, the theoretical background of the above mentioned conventional methods and equipments have not been based on the concept to detect an abnormal conditions based on the analysis of stationary time series.

One additional drawback of conventional motion detecting and monitoring devices and methods is that generally a single video camera is used for each visual field, for which reason only two dimensional data is provided. Accordingly, when distance factors are of importance, these systems tend to be inadequate. When monitoring hazardous areas, for example, when someone appears to be approaching the point of danger, distance data is helpful for evaluating the urgency of a response to the situation, a feature which the conventional devices do not offer.

SUMMARY OF THE INVENTION

In consideration of the above, it is an object of the present invention to provide an image processing method and device which is capable of reliably and selectively detecting a target moving object, and which can do so even when the background is complex and in motion. Furthermore, it is an object of the present invention to provide a totally nonmechanical rangefinding device based on the above described image processing method and device.

In order to achieve the above object, the present invention is based on analytical methods for stochastic processes. Actual visual image data consists a set of values as a function of both time and location, each value corresponding to visual data such as brightness of a predetermined location at a predetermined time. According to the present invention, a moving object is recognized as a remarkabe deviation of data from standard along the time axis. The standard visual image is obtained by averaging visual images obtained during a period of time which is determined according to the probabilistic characteristics of both the visual image and expected event to be detected. This method is practical especially when the visual image is stationary or approximately stationary because it is expected in such a case that any normal event should fall within a predictable distribution which is obtained by a certain period of time preceeding the event. An event which is out of the predictable probabilistic distribution is a moving object in a stationary background, for example.

To achieve this object, the present invention provides an image processing method for detecting moving objects comprising the steps of:

a) obtaining sequential video data representing a consecutive series of video frames;

b) storing video data in memory for a consecutive series of video frames obtained over a predetermined time interval in the past at a predetermined sampling rate;

c) obtaining a standard image by averaging the video data stored in memory for the predetermined time interval so as to obtain video data representing a composite image for the predetermined time interval; and d) subtracting the video data for the standard image from video data for a current video frame.

Additionally, the present invention provides an image processing device for detecting moving objects comprising:

a) memory means for storing video data;

b) standard image generating means to which sequential video data representing a consecutive series of video frames is provided, whereby:

i) sequential video frames captured at a predetermined sampling rate over a predetermined time interval in the past are stored in the above mentioned memory means, and ii) video data for a standard image is generated and output, the standard image obtained by averaging the sequential video frames for the predetermined time interval stored in the memory means so as to obtain a composite image for the predetermined time interval; and c) subtraction means for subtracting the video data for the standard image from video data for a current video data frame.

DESCRIPTION OF THE PREFERRED EMBODIMENTS

First Preferred Embodiment

In the following, a first preferred embodiment of an image processing device in accordance with the present invention will be described with reference to FIGS. 1 through 4(h)

Figure 1:
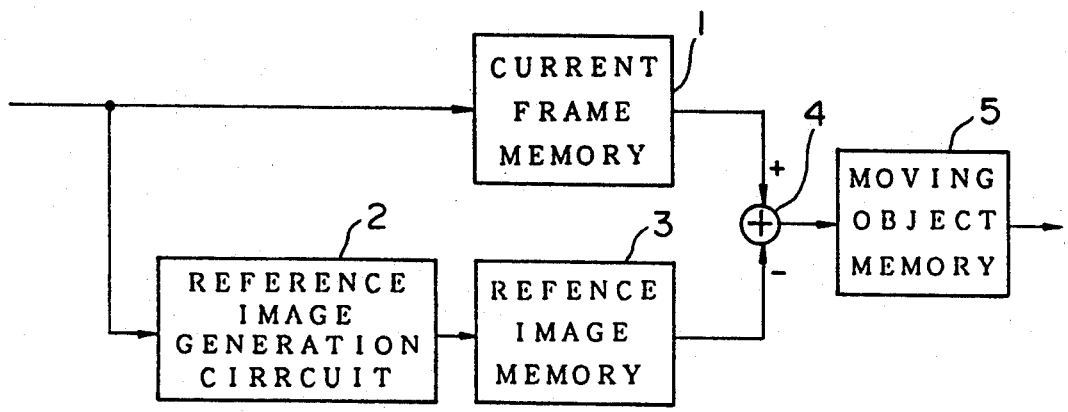
FIG. 1 is a block diagram showing the overall layout of a first preferred embodiment of the present invention.
Figure 2:
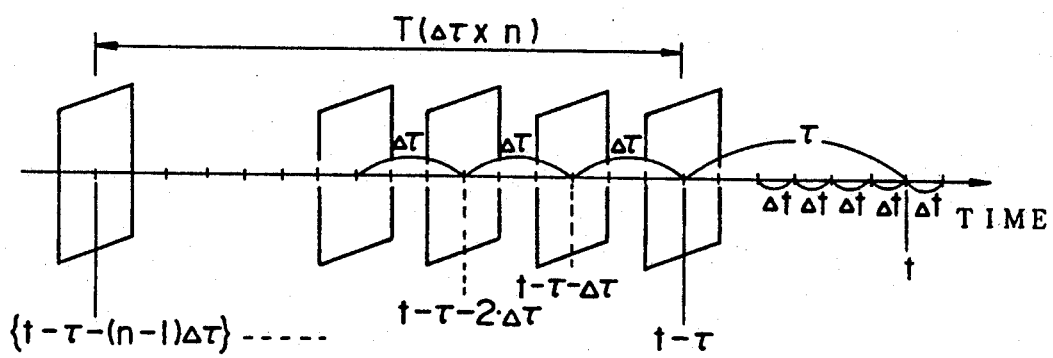
FIG. 2 is a time sequence for illustrating the general concept of a motion detecting method employed in the first preferred embodiment of the present invention.

In FIG. 1, a block diagram can be seen illustrating the overall layout the device of the present embodiment. An image processing method in accordance with the present invention serves as a basis for general operation of the device shown in FIG. 1, the time sequence of which is schematically illustrated in the time chart of FIG. 2. In FIG. 1, a standard image generation circuit 2 can be seen to which data derived from the output signal of a video camera focussed on a given visual field is sequentially supplied, one video frame at a time, at a frame interval given by $\Delta t$. The output signal of standard image generation circuit 2 at time t corresponds to a composite standard image $S_t$, which represents the result of averaging n consecutive video frames supplied t minutes previously to standard image generation circuit 2, at a frame interval given by $\Delta \tau$, where $\Delta \tau \geq \Delta t$.

Composite standard image $S_t$ represents an image of static elements in the visual field, that is, composite standard image $S_t$ represents the nonmoving background from which images of moving objects in the visual field have been eliminated through the averaging operation. Subtracting composite standard image $S_t$ from the current video frame captured at time t results in an image showing only objects which can be considered as foreign objects in the visual field at time t, that is, objects which are not part of the static background.

To describe the operation of the device of the present embodiment more specifically, a video frame captured at current time t expressed as an i by j matrix of pixel values is converted to a vector representation thereof, as given by $D_{ij}(d_{ij}, t)$, which is then stored in current frame memory 1, shown in FIG. 1. Simultaneously, the vector representation of composite standard image $S_t$ as given by $S_{ij}(s_{ij}, t)$, which will subsequently be subtracted in subtractor 4 from the current matrix stored in current frame memory 1, is stored in standard image memory 3. Vector representation $S_{ij}(s_{ij}, t)$, as obtained from standard image generation circuit 2 and stored in standard image memory 3, represents the result of individually summing and averaging the corresponding pixels for n consecutive video frames captured $\tau$ minutes prior to time t, the vector representations of which are given by $D_{ij}(t-\tau)$, $D_{ij}(t-\tau-D\tau)$, $D_{ij}(t-\tau-2\Delta\tau)$, ... $D_{ij}(t-\tau-(n-1)\Delta\tau)$. When the average of these matrices is calculated, each pixel of the resulting vector representation $S_{ij}(s_{ij}, t)$ is given as shown in Equ. 1 below:

$$d_{ij} = \overset{n}{\Sigma} d_{ij}/n \qquad \text{Equ. 1}$$

When a moving object passed through the field during the sampling period, assuming the speed thereof is sufficiently rapid, the object will most often be at a different position for each frame, for which reason following averaging operation, the moving object disappears from the resulting composite standard image $S_t$, and thus only background remains. Likewise, momentary changes in ambient light intensity and the like disappear with averaging. It can therefore be appreciated that objects passing through the visual field from time $t-96 -31 (n-1)\Delta\tau$ to time $t-\tau$ will almost always absent in the averaged image. This is an important feature of the present invention in that through a relatively simple mathematical operation, even the most complex backgrounds can be reliably masked out, thereby making it possible to eliminate any subsequent image processing of data corresponding to static elements in the video frame, in this way largely limiting subsequent processing to objects of interest.

Applying the above described operations and assumptions, the pixel matrix for composite standard image $S_t$ at time t is given by the following Equ. 2:

$$S_{ij}(s_{ij}, t) = 1/n \overset{n}{\Sigma} D_{ij}(t - \tau - (n - 1)\Delta\tau) \qquad \text{Equ. 2}$$

Vector representation $S_{ij}(s_{ij}, t)$ as calculated in Equ. 2 above has the following characteristics:

1) the signal to noise ratio corresponding to composite standard image $S_t$ is improved by a factor of a square root of n;

2) the impact of a foreign object or the like present in any one of the n video frames from which composite standard image $S_t$ is obtained is reduced by a factor of 1/n, and dissappears for a sufficiently large value for n; and 3) the effect of momentary changes in lighting and momentary changes due to precipitation, shifting clouds and the like is largely eliminated through the averaging operation.

As stated previously, in subtractor 4, the vector representation of composite standard image $S_t$ as given by $S_{ij}(s_{ij}, t)$ which is stored in standard image memory 3 is subtracted from the vector representation of the current frame as given by $D_{ij}(d_{ij}, t)$ which stored in current frame memory 1. In this way, for each current frame vector representation supplied at sampling rate of $\Delta\tau$ and stored in current frame memory 1, a vector representation for a corresponding composite standard image $S_t$ calculated in standard image generation circuit 2 and stored in standard image memory 3 is subtracted therefrom in subtractor 4. The result of each subtraction operation in subtractor 4, which is a vector representation of any foreign moving objects in the visual field at time t, is then stored in moving object memory 5, as seen in FIG. 1.

Figure 3:
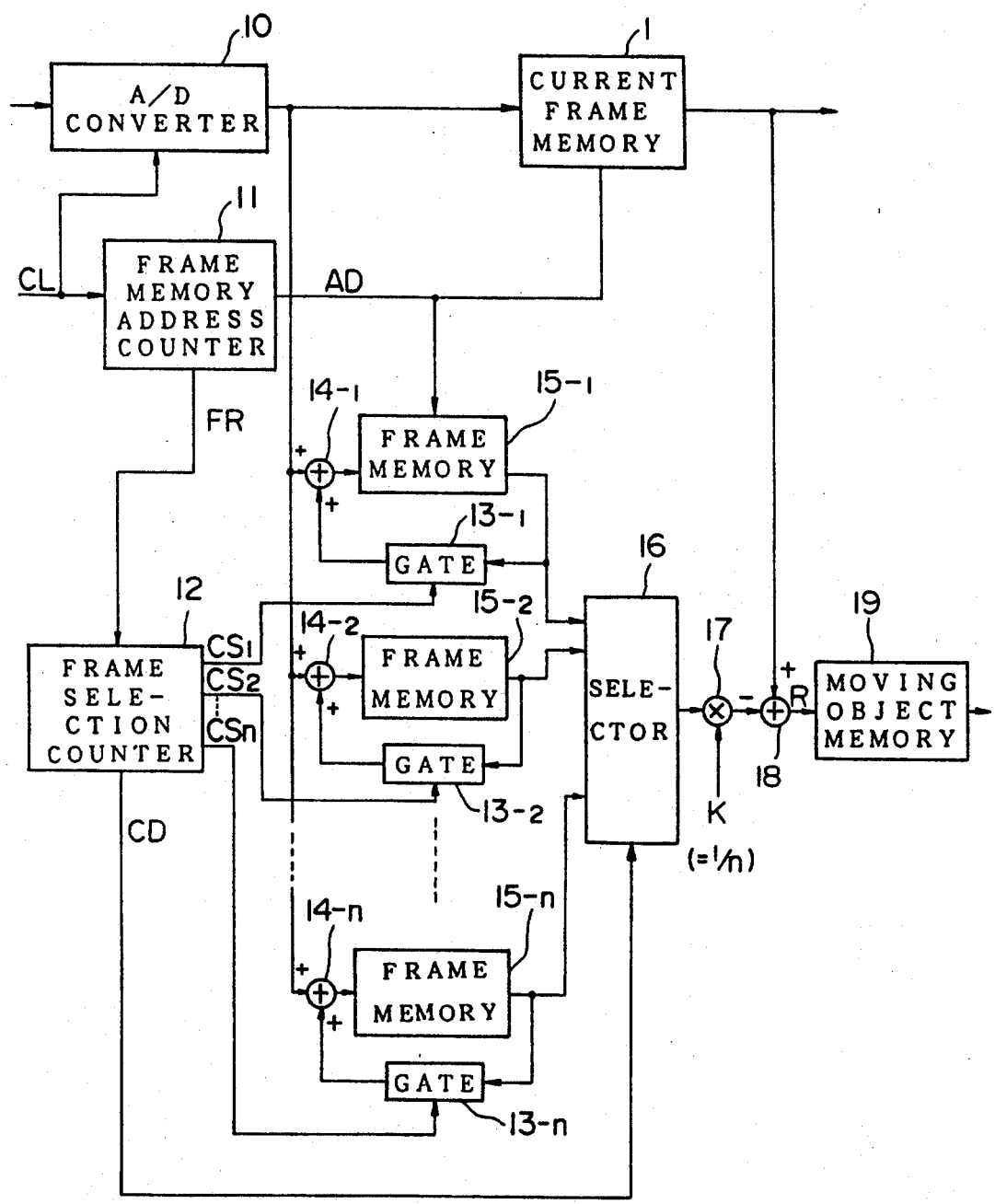
FIG. 3 is a block diagram showing the layout in detail of the first preferred embodiment of the present invention.
Figure 4:
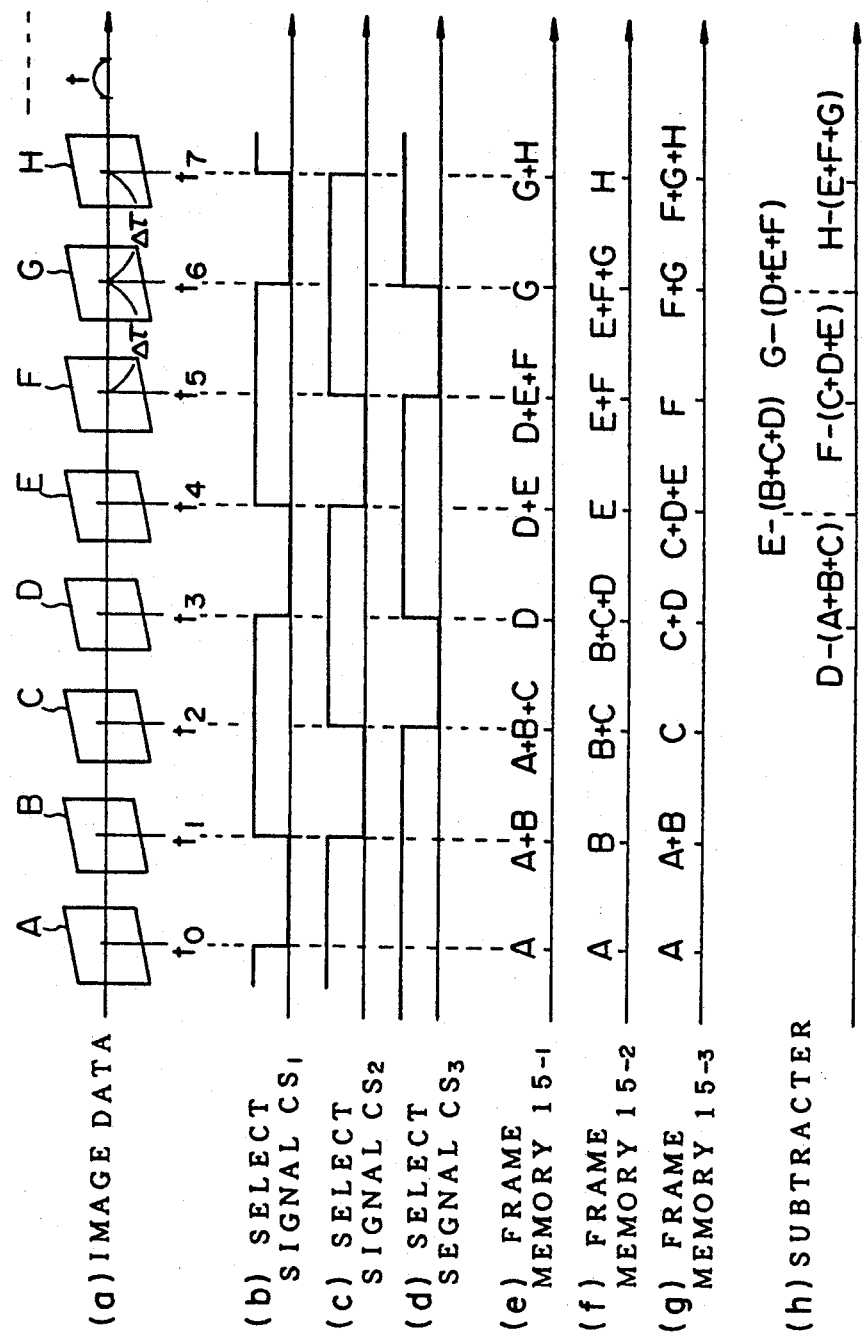
FIGS. 4(a) through 4(h) are time charts for illustrating the operation of the first preferred embodiment of the present invention.

Next, the makeup of standard image generation circuit 2 and standard image memory 3 will be described in greater detail with reference to the block diagram of FIG. 3. In this figure, an A/D converter 10 can be seen. In concert with a fundamental clock signal CL having a period of $\Delta t$, the analog current video signal which is supplied thereto is converted to a digital current video signal which is then supplied to current frame memory 1, and to each of adders $14_1$ through $14_n$ which will be described further on, where n represents a frame count.

In addition to A/D converter 10, the above mentioned fundamental clock signal CL is supplied to a frame memory address counter 11, wherein an address signal AD and a frame signal FR are generated in concert with the supplied clock signal. Address signal AD sequentially output from frame memory address counter 11 is then supplied to current frame memory 1 and to frame memory units $15_1$ through $15_n$ which will be described below, and frame signal FR is sequentially supplied to a frame selection counter 12. According to frame signal FR supplied from frame memory address counter 11, frame selection counter 12 generates selector signals $CS_1$ through $CS_n$, each of which is supplied to a corresponding gate $13_1$ through $13_n$, and a control signal CD which is supplied to a selection circuit 16.

Any signal among selector signals $CS_1$ through $CS_n$ which has a high level value results in the opening of the corresponding gate $13_i$, with the result that the output signal of the corresponding frame memory unit $15_i$ is supplied to the corresponding adder $14_i$. As described above, with each pulse of fundamental clock signal CL, the digital current video signal from A/D converter 10 is supplied to each of adders $14_1$ through $14_n$, and address signal AD from frame memory address counter 11 is supplied to each of memory units $15_1$ through $15_n$. As a consequence, for any of selector signal $CS_1$ through $CS_n$ with a high level, the current output of the corresponding memory unit $15_i$ is added to the digital current video signal in the corresponding adder $14_i$, the result of which is again stored in that memory unit $15_i$ at the memory location therein indexed by address signal AD. Conversely, for any of selector signal $CS_1$ through $CS_n$ with a low level, the current output of the corresponding memory unit $15_i$ is simply again stored in that memory unit $15_i$ at the memory location indexed by address signal AD. As this process takes place over time, each of memory units $15_1$ through $15_n$ comes to hold video frame data for multiple video frames.

As mentioned above, control signal CD output from frame selection counter 12 is supplied to a selection circuit 16. On this basis, the output csignal of one of frame memory units $15_1$ through $15_n$ is output via selection circuit 16 and supplied to a multiplier 17. In multiplier 17, the supplied value is muliplied by 1/n, the result of which is supplied to a subtractor 18 which also receives an output signal from current frame memory 1. The value supplied to subtractor 18 from multiplier 17 is subtracted from the value supplied from current frame memory 1, thereby obtaining video data R which is then stored in moving object memory 19.

The operation of the present embodiment as thus described will now be explained with reference to the time charts of FIGS. 4(a) through 4(h). For the sake of simplicity, the case in which any composite standard image S is composed of only three frames will be considered.

To start, after the device has been activated, a composite standard image $S_0$ for time t=0 must be calculated in standard image generation circuit 2 and stored in standard image memory 3 as a basis for subsequent processing. To do so, the current output signal of the video camera employed is converted to a digital video signal A in A/D converter 10, the result of which is stored in current frame memory 1 and supplied to adders $14_1$, $14_2$ and $14_3$. Based on the frame signal FR output from frame address counter 11, selector signal $CS_1$ supplied from frame selection counter 12 to gate $13_1$ is low, as is shown in FIG. 4(b), for which reason digital video signal A in adder $14_1$ is stored without change in memory unit $15_1$ at the memory location therein indexed by address signal AD from frame memory address counter 11, as shown in FIG. 4(e). Although selector signals $CS_2$ and $CS_3$ are high, during initialization there is no preexisting video data for composite standard image S since the device has just been activated. As a result, the addenda in adders $14_2$ and $14_3$ is zero, for which reason video signal A is likewise stored unchanged in memory units $15_2$ and $15_3$ at the memory location indexed by address signal AD as can be seen in FIGS. 4(f) and 4(g).

At time t=1 when digital video signal B is supplied from A/D converter 10 to adders $14_1$, $14_2$ and $14_3$, selector signals $CS_1$ and $CS_3$ are high, whereas selector signal $CS_2$ is low, with the result that video signal A+B is stored in memory units $15_1$ and $15_3$ at the memory location currently indexed by address signal AD, whereas video signal A is again stored in memory unit $15_1$ at the memory location indexed by address signal AD. In consideration of the above, and with reference to FIGS. 4(a) through 4(h), it can be appreciated that at time t=2 when digital video signal C is supplied from A/D converter 10 to adders $14_1$, $14_2$ and $14_3$, and when selector signals $CS_1$ and $CS_2$ are high and selector signal $CS_3$ is low, video signal A+B+C is stored in memory unit $15_1$, video signal B+C is stored in memory unit $15_2$, and video signal C is stored in memory unit $15_3$.

At time t=3, digital video signal D is supplied from A/D converter to adders $14_1$, $14_2$ and $14_3$, selector signal $CS_1$ is low and selector signals $CS_2$ and $CS_3$ are high, with the result that video signal D is stored in memory unit $15_1$, video signal B+C+D is stored in memory unit $15_2$ and video signal C+D is stored in memory unit $15_3$. Additionally, a control signal CD which selects memory unit $15_1$ is now supplied to selection circuit 16, with the result that video signal A+B+C which was stored in memory unit $15_1$ at time t=2 is supplied to multiplier 17 via selection circuit 16. In multiplier 17, video signal A+B+C from memory unit $15_1$ is multiplied by 1/n which is ⅓ in the present example, whereby the average of video signals A, B and C is determined and supplied to subtractor 18, wherein this average value is subtracted from the current output of A/D converter 10 which is video signal D, the result of which is stored in moving object memory 19 as video data R.

The above described operation continues as long as the device is in operation, and as can be seen in FIG. 4(h), for the three frame model, the value for video data R consecutively calculated in subtracter 18 and stored in moving object memory 19 is the result of subtracting the average video signal for the preceding three sampling periods from the video signal for the current sampling period, i.e. the value for video data R consecutively stored in moving object memory 19 for t=3, t=4, t=5, t=6. . . is D−(A+B+C)/3, E−(B+C+D)/3, F−(C+D+E)/3, G−(D+E+F)/3 . . . Analagous results are obtained for more than three frames.

Figure 5:
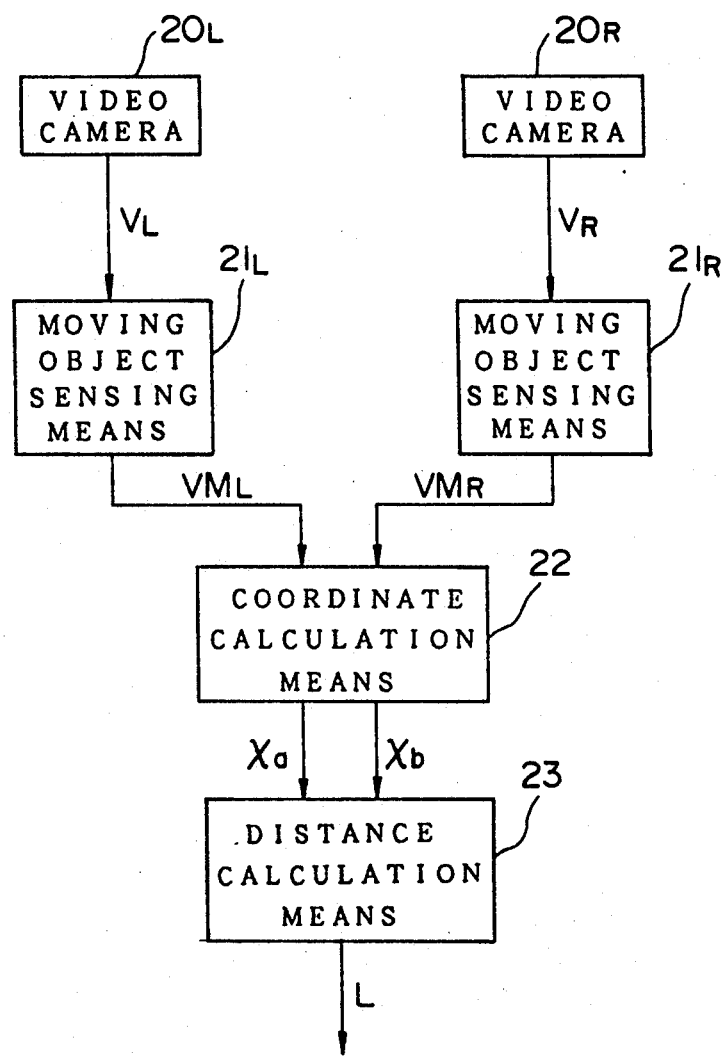
FIG. 5 is a block diagram showing the overall layout of a second preferred embodiment of the present invention.

In FIG. 5, a block diagram showing the overall layout of an example of a motion sensor with range finding capabilities in accordance with the present invention is shown.

Serving as video input devices, two video cameras 20L, 20R can be seen in FIG. 5. Each of video cameras 20L, 20R is mounted at a fixed position with a predetermined space therebetween and a predetermined orientation. Electronically controllable zoom lenses are used so that the magnification of each can be set to a desired value.

Figure 6:
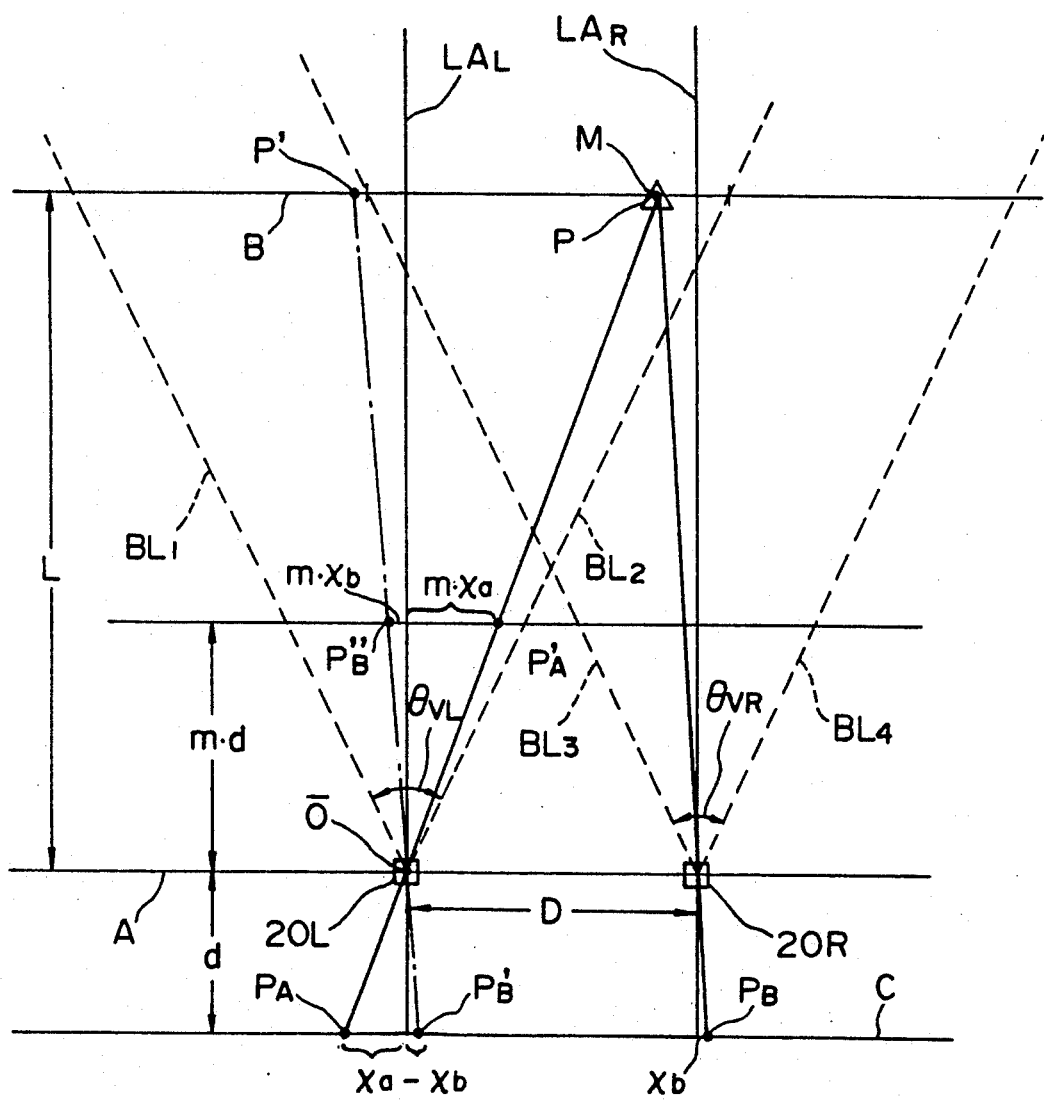
FIG. 6 is an overhead view schematically illustrating the video camera placement in the second preferred embodiment of the present invention.

With reference to FIG. 6, the relationship between the placement and orientation of video cameras 20L, 20R and moving objects in the visual field will be described with reference to FIG. 6. The optical axis of each of video cameras 20L, 20R are labeled as LAL and LAR, respectively, and as seen in the drawing, are oriented so as to parallel with respect to one another. The lateral distance between video cameras 20L, 20R is labeled D in FIG. 6. The angles inscribed in the horizontal plane by the visual field of video cameras 20L, 20R are shown as $\theta_{VL}$ and $\theta_{VR}$, respectively. The values for as $\theta_{VL}$ and $\theta_{VR}$ vary depending on the chosen lens magnifications. The visual field over which the device of the present embodiment effectively functions is defined by the region of overlap of the visual fields of video cameras 20L, 20R. As should be obvious from the above discussion, the effective visual field for the device as a whole can be varied to suit requirements by varying the magnification of the lenses of video cameras 20L, 20R. An object intruding into the visual field under surveillance is shown labeled as M.

From the output signals of video cameras 20L, 20R, video signals VL and VR, respectively are derived therefrom, which represent sequential video frames captured by the respective video camera 20L, 20R, one video frame at a time, at a frame interval given by Δt. Video signals VL and VR thus generated and output are then supplied to a respective moving object detection means 21L, 21R. Moving object detection means 21L, 21R each consist essentially of a video signal processing circuit which acts to extract data corresponding only to moving objects from the supplied video signals VL, VR, in this way subtracting out background. The actual operation of moving object detection means 21L, 21R is identical to that of the first preferred embodiment of the present invention as described earlier, and for that reason, discussion thereof will not be repeated. Output signals VML, VMR of moving object detection means 21L, 21R, respectively, contain data representations of moving objects only in their respective visual fields, and are both supplied to a coordinate calculation means 22.

Returning again to FIG. 6, the optical centers of each of video cameras 20L, 20R lie on an imaginary line A shown in FIG. 6. An imaginary line B is shown in the drawing which passes through the moving object M and which is parallel to imaginary line A. The focal plane of each of video cameras 20L, 20R lie on an imaginary line C shown in FIG. 6, and the horizontal distance between line A and line C is given by d. The distance which the device of the present embodiment determines is distance L which is the length of the shortest line connecting line A and line B.

The moving object M is shown in FIG. 6 at a point P at which the object is within the visual field of both of cameras 20L, 20R. At this point in time, the point at which the image of object M intersects the focal plane of camera 20L is shown as point $P_A$. The distance between point $P_A$ and the optical axis of camera 20L in the focal plane thereof is given by $x_a$. Similarly, the point at which the image of object M intersects the focal plane of camera 20R is shown as point PB and the distance between point PB and the optical axis of camera 20R in the focal plane thereof is given by $x_b$. The previously mentioned coordinate calculating means 22 calculates each of the above described distances $x_a$ and $x_b$, and supplies them to a distance calculation means 23.

Through trigonometric analysis of the various relationships described above and shown in FIG. 6, the following Equ. 4 can be obtained:

$$L/d = D/(x_a - x_b) \qquad \text{Equ. 4}$$

transformation of which yields Equ. 5 below:

$$L = d \cdot D/(x_a - x_b) \qquad \text{Equ. 5}$$

Similarly, the following Equ. 6 can be obtained:

$$L/md = D/m(x_a - x_b) \qquad \text{Equ. 6}$$

transformation of which yields Equ. 7 below:

$$L = md \cdot D/(x_a - x_b) \qquad \text{Equ. 7}$$

Figure 7:
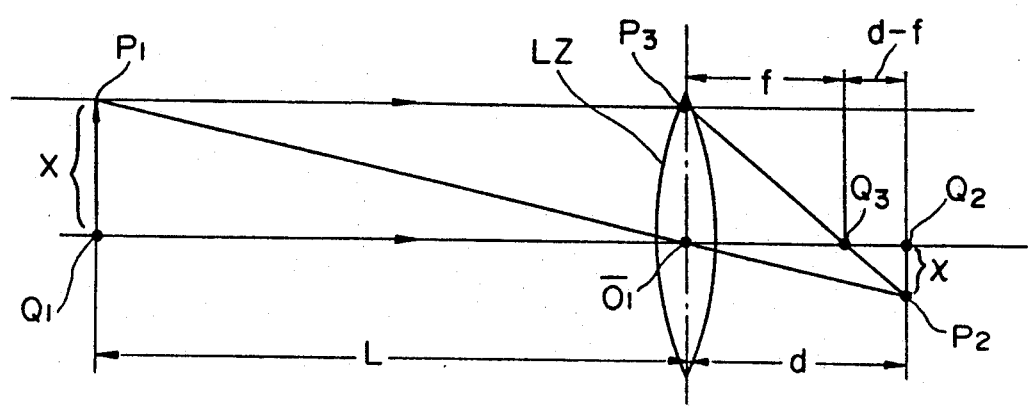
FIG. 7 is a schematic diagram for illustrating the procedures whereby the distance up to a moving body is determined according to the present invention.

Referring to FIG. 7, the relationship between the focal length f of each of cameras 20L, 20R and distance d will be described. In this figure, lens LZ has a focal length given by f. An object having length X is separated from lens LZ by distance L, and is projected for a length x on the focal plane of lens LZ. The distance from lens LZ to the focal plane thereof is given by d. From these relationships, the following equations can be derived:

$$X/L = x/d \qquad \text{Equ. 8}$$

$$x/(d-f) = X/f \qquad \text{Equ. 9}$$

From Equ. 8 and 9, Equ. 10 below is obtained:

$$L = df/(d-f) \qquad \text{Equ. 10}$$

In the same way, Equ. 11 below is obtained:

$$d = fL/(L-f) \quad \text{Equ. 11}$$

Combining Equ. 7 and 11, Equ. 12 is obtained:

$$L = mD \cdot fL/(X_a - X_b)(L-f) \quad \text{Equ. 12}$$

Transforming Equ. 12 gives Equ. 13:

$$L = f(1 + mD/(X_a - X_b)) \quad \text{Equ. 13}$$

By making distance D between cameras 20L, 20R sufficiently large, $mD \gg X_a - X_b$, on which basis the right side of Equ. 13 can be approximated and simplified to give Equ. 14 below:

$$L = mfD/(X_a - X_b) \quad \text{Equ. 14}$$

Based the above described mathematical relationships, from distances $x_a$, $x_b$, the distance L separating object M from cameras 20L, 20R can be calculated using Equ. 13.

Application of the Present Invention

Figure 8:
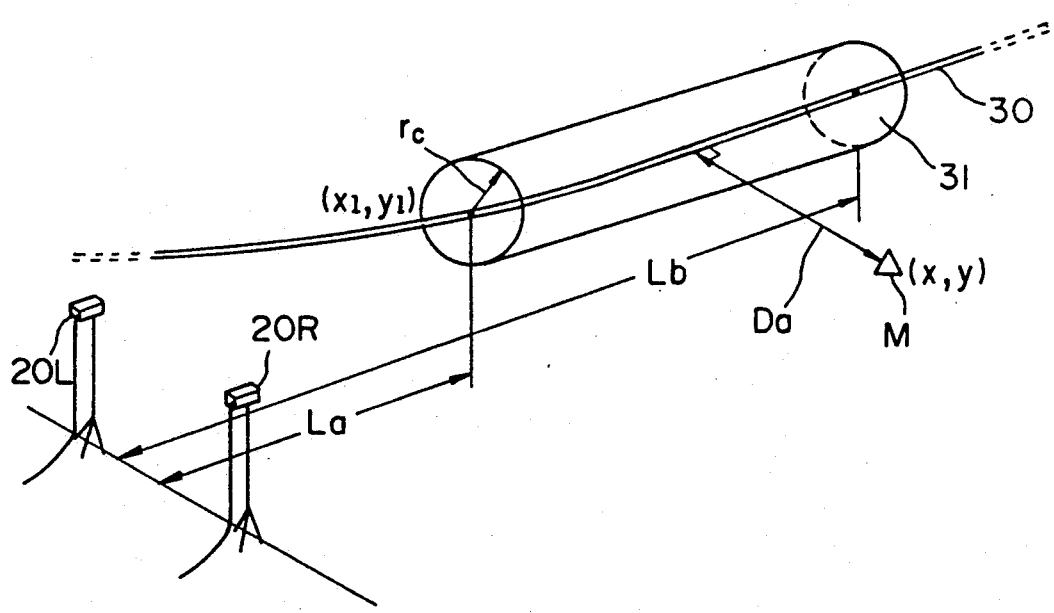
FIG. 8 is a schematic diagram illustrating the operation of an application of the present invention.

The application using the image processing device on a high voltage power line will be described. FIG. 8 is a schematic diagram illustrating the operation of an application of the present invention. In FIG. 8, a restricted area 31 is provided around the power line 30. Coordinates (xL,yL) of the power line 30, a distance (rc) from the power line 30, to the border plane of the restricted area 31, and the distance (La,Lb) from the video cameras 20L and 20R to the edges of the restricted area 31, are stored in a fixed memory. In this case, the coordinated (x,y) of the moving object M on the monitor, and the distance L, are calculated by the operation described. The distance from the video cameras 20L and 20R to the moving object M, are supplied to a controller (not shown). The controller distinguishes, based on the distance L, whether there is a moving object M between distance La and distance Lb. If there is a moving object M in the distance of Lb—La, the controller distinguishes whether the moving object M is in the restricted area 31 or not, based on the coordinates (x,y) using the following Equ. 15

$$Da = SQR((x-xL)\$ + (y-yL)\$) \quad \text{Equ. 15}$$

The label Da shows a distance from the moving object M to the power line 30. It is assumed that the power line 30 does not change the coordinated, and the restricted area 31 is fixed. If the power line 30 is constructed diagonally to the front of the video cameras 20L and 20R, the distance Da is calculated on the distance (L) of the moving object (M), and the (XY) coordinates of the power line 30. If the distance Da is shorter than the distance rc, the controller distinguishes the moving object (M) comming into the restricted area 31, and gives a warning or removes the moving object(M). As described above, in this application, the device detects the moving object (M), which comes into the view of the cameras 20L and 20R, measures the distance L to the moving object (M), distinguishes that the moving object (M) comes into the restricted area 31. Although the moving object detection 21L and 21R, are constructed with hardware in the above described embodiments, it may be verified with software. The coordinate calculation 22, and the distance calculation 23, are also verified with software.

What we claim is:

1. An image processing method for detecting a moving object in a field of view comprising the steps of:
   a) utilizing a video camera to generate sequential video data on a field of view of the video camera comprising a consecutive series of video frames taken by the video camera;
   b) storing the sequential video data generated by the video camera in a memory for a consecutive series of video frames obtained over a predetermined time interval at a predetermined sampling rate;
   c) generating a standard image by averaging the video data stored in memory for the predetermined time interval to obtain video data representing a composite standard image over the predetermined time interval; and
   d) subtracting the video data for the standard image from video data for a current video frame to detect a moving object in the field of view.

2. An image processing method in accordance with claim 1, further including storing each consecutive current video frame in a current frame memory, wherein as the sequential video data representing a consecutive series of video frames is obtained, each consecutive current video frame is stored in the current frame memory, and said subtracting step subtracts the video data for the standard image from the video data stored in said current frame memory.

3. An image processing device for detecting a moving object in a field of view comprising:
   a) a video camera for detecting sequential video data comprising a consecutive series of video frames of the field of view;
   b) a memory, coupled to said video camera, for storing sequential video data;
   c) means, coupled to said memory, for generating a standard image from the sequential video data comprising a consecutive series of video frames including,
      i) means for storing in said memory consecutive video frames captured at a predetermined sampling rate over a predetermined time interval, and
      ii) means for generating video data for a standard image by averaging the consecutive video frames for the predetermined time interval stored in the memory to obtain a composite standard image for the predetermined time interval; and
   d) subtraction means for subtracting the video data for said standard image from video data for a current video data frame to detect a moving object in the field of view.

4. An image processing device in accordance with claim 3, including a current frame memory, wherein as the sequential video data representing a consecutive series of video frames is obtained, each consecutive current video frame is stored in the current frame memory, and said subtraction means subtracts the video data for the standard image from the video data stored in said current frame memory.

5. A rangefinder for measuring a moving object in a field of view comprising:
   a) a first video camera for generating video data from images of objects which move in a first field of view, said first video camera having a variable magnification and an optical axis which is oriented towards the first field of view;

b) a second video camera for generating video data from images of objects which move in a second field of view, with the second video camera being mounted at a predetermined distance from the first video camera, said second video camera having a variable magnification and an optical axis which is oriented substantially parallel with the optical axis of the first video camera and having a second field of view which has a region of overlap with the first field of view of the first video camera; and c) distance calculation means for calculating a distance to a moving object in the first and second fields of view of the first and second video cameras from the generated video data from the first and second video cameras.

* * * * *

UNITED STATES PATENT AND TRADEMARK OFFICE
CERTIFICATE OF CORRECTION

PATENT NO. : 5,212,547
DATED : May 18, 1993
INVENTOR(S) : Akira Otsuki It is certified that error appears in the above-identified patent and that said Letters Patent is hereby corrected as shown below:

```
        Column 4, line 42:  "t-96 -31"  should read
--t - τ - --
        Column 5, lines 39 & 57:  "15n"  should read
--15_n--
        Column 6, line 6:  "15n"  should read  --15_n--
        Column 6, line 62:  after "converter" insert
--10--
        Column 8, lines 29 & 30:  "PB"  should read  --P_B--
```

Signed and Sealed this

First Day of March, 1994

BRUCE LEHMAN

Attest:

Attesting Officer    Commissioner of Patents and Trademarks